Patented July 28, 1931

1,816,441

UNITED STATES PATENT OFFICE

CHARLES H. PEET, OF BRISTOL, PENNSYLVANIA, ASSIGNOR TO ROHM AND HAAS COMPANY, A CORPORATION OF DELAWARE

INSECTICIDE, FUNGICIDE AND DISINFECTANT

No Drawing.   Application filed August 8, 1927.  Serial No. 211,631.

This invention relates to the use of a series of organic derivatives which are of value as insecticides, fungicides and disinfectants. Throughout the following application, the use of these compounds as fungicides and disinfectants is comprehended within the term "insecticide". The term "insect", as connected with the word "insecticide" in this application, is understood to mean any of the numerous, small invertebrate animals, generally having the body more or less segmented, for the most part belonging to the class "Insecta", comprising six-legged, usually winged forms, as beetles, bugs, bees, flies, etc., and to other allied classes of Arthropoda, whose members are wingless and usually have more than six legs, as spiders, mites, ticks, centipedes, wood lice, etc.

Heretofore chief reliance was placed in the control of insect pests on arsenicals and lead compounds, but lately their use has become questionable because of the fact that any of the insecticide left on the fruit or other edible part of the plant is a menace to man and domestic animals. There is, therefore, an insistent demand for insecticides that will be harmless and still at least as effective as those hitherto employed. There are insecticides that fulfill this requirement but fall short in certain other respects.

Insect flowers, for instance, have been known for a long time, and the flowers themselves and the extracts made from them are highly poisonous to most insects. The investigations of Staudinger have shown that the active principle of the insect flower, or Pyrethrum, is an ester, which loses its insecticidal value on saponification. Furthermore, the active principle is a compound which is very difficult to evaluate by chemical means, and, consequently, a control of its strength at the place of manufacture and in the consumer's hands cannot be made except by biological assay, a procedure that is tedious and not always reliable without very careful checks. It is also quite expensive.

Another insecticide, that is fairly effective for certain classes of insects and comparatively innocuous for humans and domestic animals, is sodium fluoride. However, the concentration necessary makes its application generally rather difficult. A few organic compounds, such as para dichlorobenzol, cresol and others have only very limited fields of application. Nicotine, which is very effective in certain cases of greenhouse infestations, is toxic for humans and is quite expensive. Soaps, such as, for instance, fish, whale oil and rape oil soaps, are not very powerful and are sometimes harmful to foliage.

It has heretofore been suggested (United States Department of Agriculture Bulletin No. 1313, pages 6, 10 and 15) that certain monochloroacetyl compounds may be used as fumigants. However, for this purpose the material must be used in the gaseous phase, and readily volatile compounds such as monochloroacetone or chloroacetophenone are necessary to give the proper vapor concentration. While such materials have a fumigating action, it is known that they are chemically closely related to certain so-called tear gases and that they are extremely irritating to the eyes and mucous membrane. For this reason they can only be used under carefully controlled fumigating conditions and their general use as a household insecticide is from a practical standpoint as much out of the question as would be the use of poisonous gases.

I have discovered that less volatile compounds containing the monochloroacetyl group, even though useless as fumigants, have extremely valuable qualities as insecticides, fungicides or disinfectants, when used in the non-gaseous phase. I have further found that these materials can be used for these purposes without precaution and in rooms intended for human habitation without such use causing any objectionable effect. This difference in action is undoubtedly due to the low vapor tension of such materials, and can be augmented (particularly in the case of materials approaching closely to the line of substances available as fumigants) by combining such substance with another liquid (either in solution or dispersed in such other liquid) so that the vapor tension of the monochloroacetyl compound is substantially reduced.

Thus, I can use compounds having a vapor tension as high as that of amyl monochloroacetate when the same is properly combined with another liquid. I prefer, however, to use even less volatile materials and have found that the efficiency thereof is increased if a compound is selected having two or more monochloroacetyl groups included in the molecule. Thus I have found that monochloroacetates of the polyhydric alcohols are particularly efficient but other substances having relatively low vapor tensions (ranging from substantially zero up to the vapor tension of amyl-monochloroacetate) can be used which will act in either the liquid or solid state as shown by the following examples:

*Example (1).*—A $\frac{1}{10}$ molar solution of glyceryl trimonochloroacetate in a hydrocarbon mixture, or other solvent, will kill Dermestes vulpinus, cockroaches, flies, ants and aphis by dipping or spraying.

*Example (2).*—A $\frac{1}{10}$ molar emulsion of cyclohexanol monochloroacetate in a water solution of soap will kill Dermestes vulpinus, aphis, Japanese beetle and cockroaches.

*Example (3).*—The vapors of ethylene glycol dimonochloroacetate will kill houseflies in an enclosed space at the dilution of one-fourth gram in 216 cubic feet. In this case 15 to 20 cubic centimeters of kerosene, containing one-fourth gram of ethylene glycol dimonochloroacetate, was sprayed into the chamber.

*Example (4).*—Dermestes vulpinus dipped into or sprayed with the undiluted BB' dichloroisopropyl monochloroacetate are killed promptly.

*Example (5).*—A 16/100% water solution of neutral sodium monochloroacetate killed aphis, or an $\frac{8}{10}$% water solution of the same salt killed Dermestes vulpinus.

*Example (6).*—A powder composed of 33⅓% omega chloroacetanilide (N-monochloroacetylanilin) and 66⅔% of some inert diluent, such as calcium carbonate, silicon dioxide, etc., blown upon or otherwise brought in contact with Blattella germanica kills these insects.

*Example (7).*—A 10% mixture of beta chloroethyl monochloroacetate in some food substance, which is attractive for the insects, such as beef extract or other proteid material for Dermestes vulpinus, does not repel the insect and does kill it after ingestion.

*Example (8).*—A $\frac{1}{10}$ molar solution of ethylene glycol dimonochloroacetate in a mixture of kerosene and solvent naphtha when sprayed upon freshly deposited eggs of Musca domestica in their natural environment, i. e., horse manure, prevented the hatching of these eggs.

*Example (9).*—A $\frac{1}{10}$ molar mixture of trimethylene glycol dimonochloroacetate in water killed the larvae of Dermestes vulpinus and of Musca domestica when these larvae were sprayed with this insecticide.

*Example (10).*—A $\frac{1}{10}$ molar solution of trimethylene glycol dimonochloroacetate in a mixture of kerosene and solvent naphtha prevented the emergence of the adults of Musca domestica from their pupae.

*Example (11).*—Twenty-four hours after the application of a 1% (by volume) emulsion of cyclohexyl monochloroacetate in water to a medium containing spores of Aspergillus flavus no growth of the organism could be observed.

*Example (12).*—Twenty-four hours after the application of a 1% (by volume) emulsion of isoamyl monochloroacetate in water to a medium containing spores of Aspergillus flavus no growth of the organism could be observed.

In giving these concrete examples, I am not limiting myself to the specific compounds mentioned; nor do I wish to limit myself to the particular insects mentioned, nor to the particular methods of application described. Generally speaking, I have found that all kinds of insects are killed by every type of compound containing the monochloroacetyl group, but the amount necessary varies with the susceptibility of the insect and toxicity of the compound.

I claim:

1. An insecticide, fungicide and disinfectant comprising a monochloroacetic acid ester of a saturated aliphatic polyhydric alcohol.

2. An insecticide, fungicide and disinfectant comprising a monochloroacetic acid ester of a saturated aliphatic polyhydric alcohol in which all hydroxy groups are completely esterified by monochloroacetic acid.

3. As an insecticide, fungicide and disinfectant, ethylene glycol di-monochloroacetate,

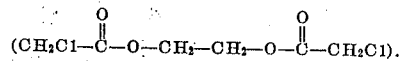

4. An insecticide, fungicide and disinfectant adapted for use in the presence of human beings, comprising a minor proportion of a monochloroacetyl compound having a vapor tension ranging between substantially zero and that of amylmonochloroacetate and a major proportion of a distending liquid.

CHARLES H. PEET.